United States Patent [19]

Sumiuchi et al.

[11] Patent Number: 5,087,316
[45] Date of Patent: Feb. 11, 1992

[54] TRANSFER APPARATUS FOR TIRE CONSTITUTING MEMBERS

[75] Inventors: Masaharu Sumiuchi; Seiichiro Nishide, both of Tokyo, Japan

[73] Assignee: Bridgestone Corporation, Tokyo, Japan

[21] Appl. No.: 401,588

[22] Filed: Aug. 31, 1989

[30] Foreign Application Priority Data

Sep. 6, 1988 [JP] Japan .................. 63-222839

[51] Int. Cl.⁵ ............................................. B29D 30/30
[52] U.S. Cl. .................................. 156/396; 156/126; 156/406.2
[58] Field of Search ............ 156/406.2, 406.4, 406.6, 156/396, 111, 126, 133; 294/93-97

[56] References Cited

U.S. PATENT DOCUMENTS

| | | |
|---|---|---|
| 3,784,426 | 1/1974 | Woodhall et al. . |
| 4,007,080 | 2/1977 | Klöpper .................. 156/406.2 |
| 4,053,342 | 10/1977 | Appleby et al. . |
| 4,105,487 | 8/1978 | Suzuki et al. . |
| 4,190,482 | 2/1980 | Yabe . |
| 4,473,427 | 9/1984 | Irie . |
| 4,830,693 | 5/1989 | Okafuji et al. .................. 156/406.2 |

FOREIGN PATENT DOCUMENTS

| | | |
|---|---|---|
| 2349030 | 4/1975 | Fed. Rep. of Germany . |
| 63-59524 | 3/1988 | Japan . |
| 63-218338 | 9/1988 | Japan . |

*Primary Examiner*—Geoffrey L. Knable
*Attorney, Agent, or Firm*—Sughrue, Mion, Zinn, Macpeak & Seas

[57] ABSTRACT

A transfer apparatus for tire constituting members transfers them from a pre-process drum such as a carcass band forming drum to a post-process drum such as a tire forming drum. The apparatus includes a movable frame movable between the pre-process drum and the post-process drum, a holder mounted on the movable frame so that the holder is able to surround and grasp the tire constituting member, and a correction mechanism mounted on the holder on a near side to the post-process drum to expand an axial end of the tire constituting member which is tapered due to rubber contraction and gravity for correcting the tire constituting member into a substantially cylindrical shape.

5 Claims, 16 Drawing Sheets

FIG_9

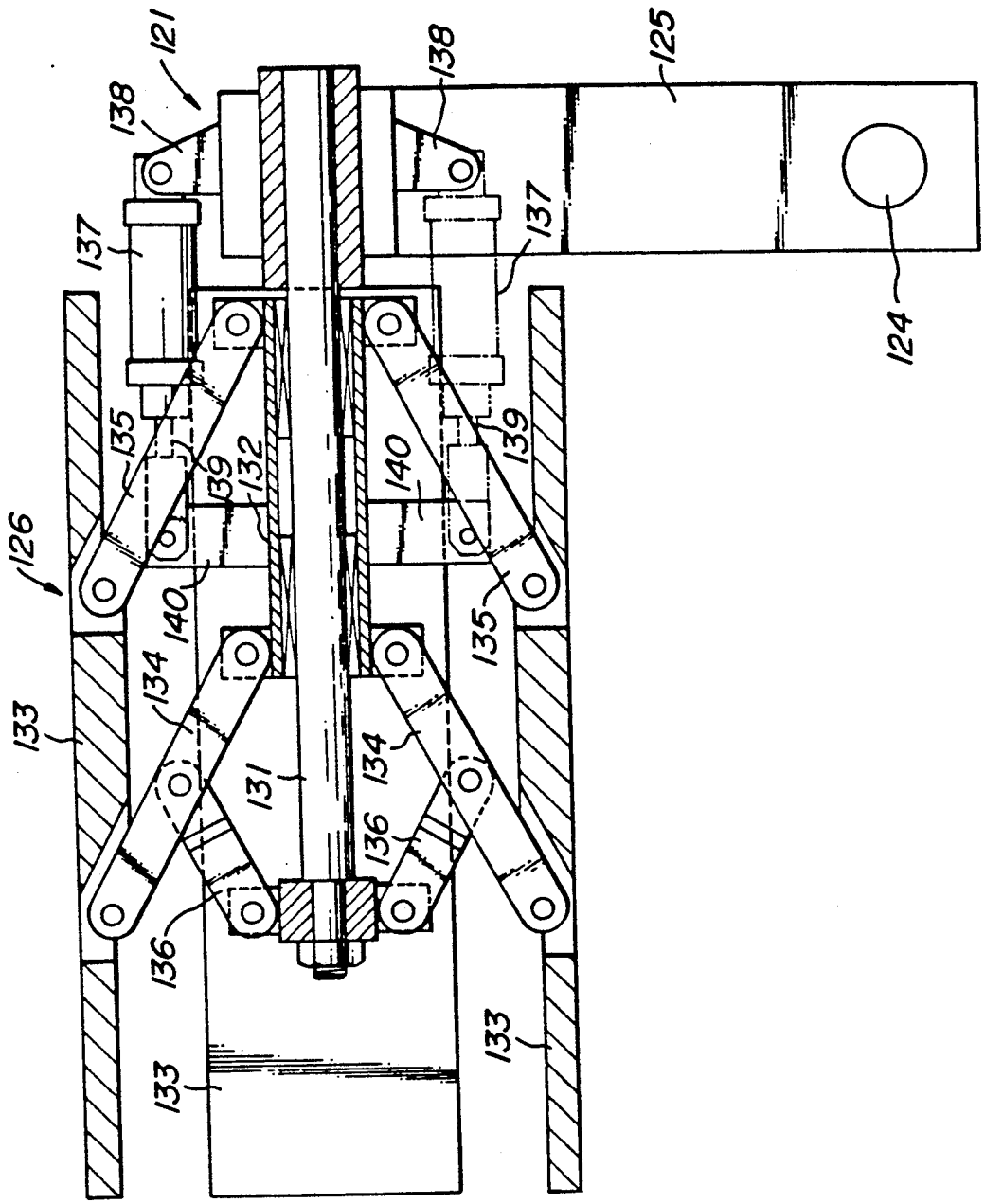

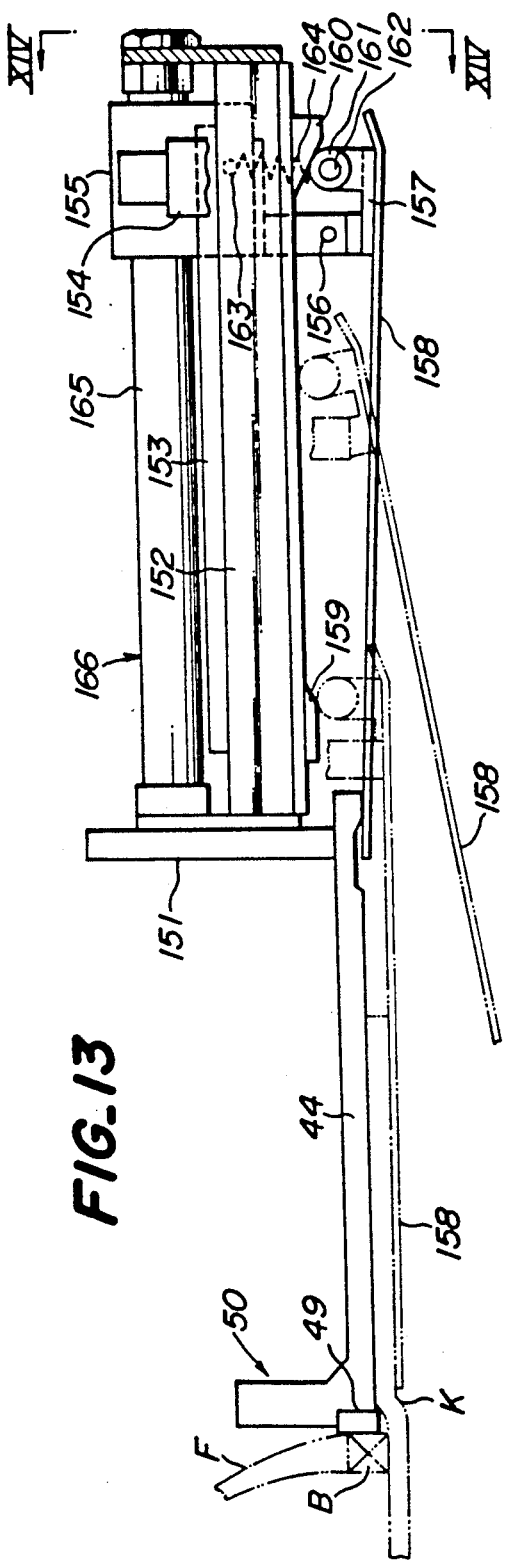
FIG_13
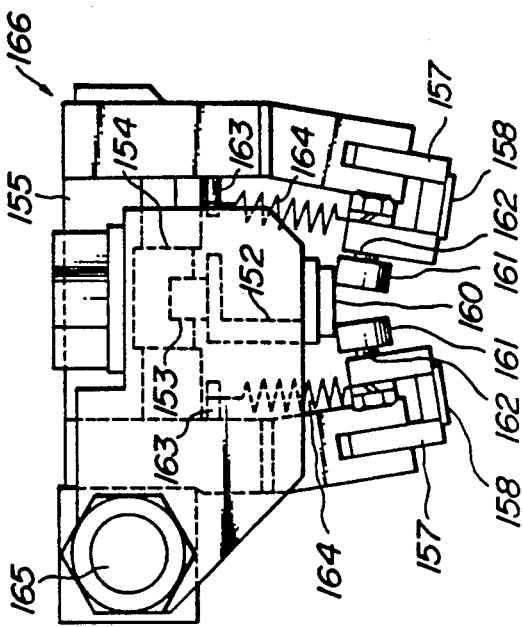
FIG_14

FIG_15a
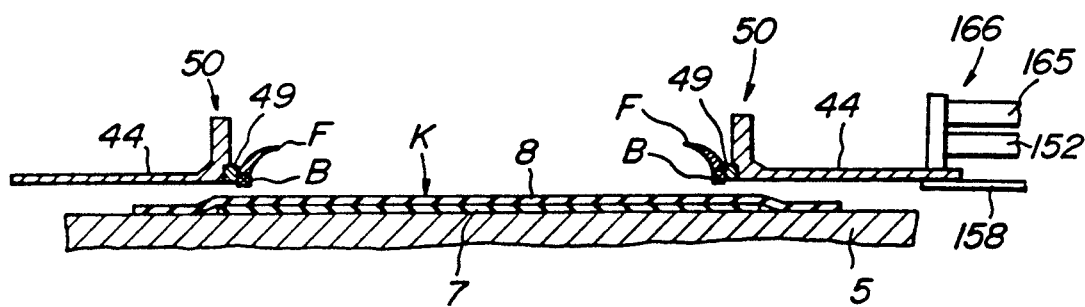
FIG_15b
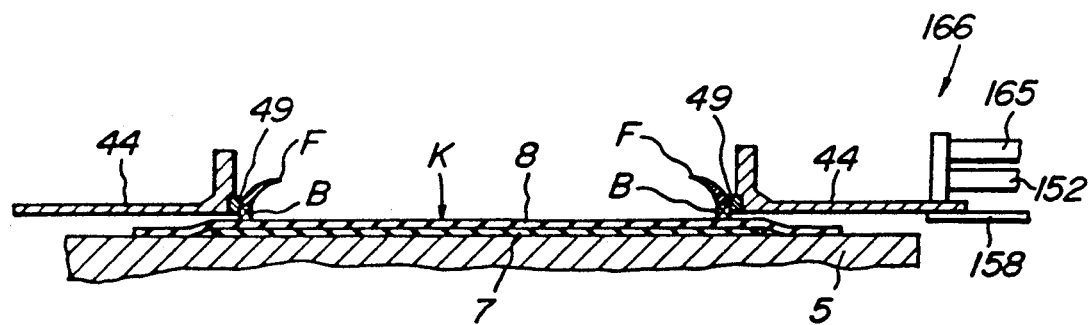

FIG._15e
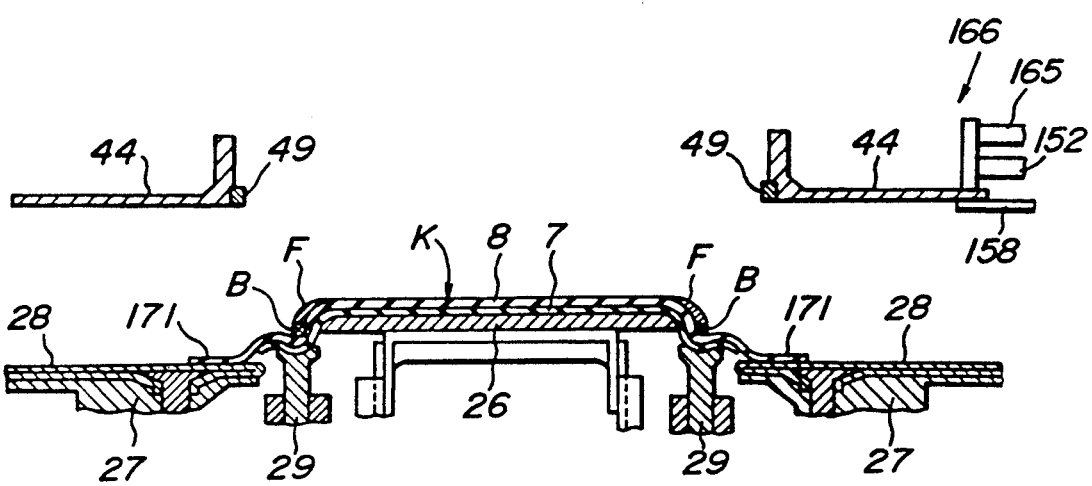
FIG._15f
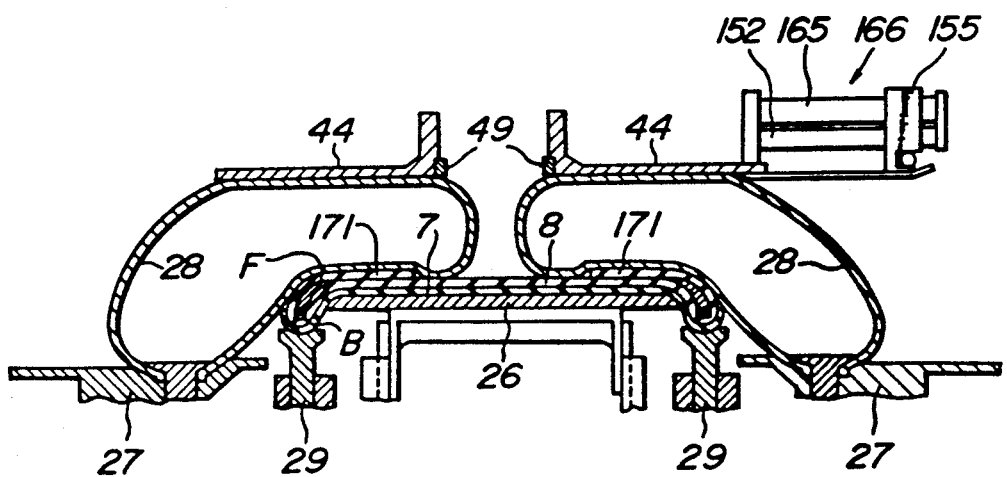

1

TRANSFER APPARATUS FOR TIRE CONSTITUTING MEMBERS

BACKGROUND OF THE INVENTION

This invention relates to a transfer apparatus for transferring cylindrical tire constituting members from a pre-process drum to a post-process drum.

A transfer apparatus for tire constituting members hitherto used has been known as disclosed in Japanese Patent Application Publication No. 55-38,265. This apparatus includes an annular frame movable between a carcass band forming drum as a pre-process drum and a tire forming drum as a post-process drum. An arcuate tire constituting member carrying mechanism is mounted on the annular frame and outwardly surrounding a tire constituting member, for example, a carcass band to grasp it. Where the tire constituting member is transferred by such an apparatus, after outwardly grasping the tire constituting member with its axial center portion, the annular frame is moved from the carcass band forming drum toward the tire forming drum to transfer the tire constituting member to the tire forming drum.

With such a transfer apparatus, however, as the tire constituting member is simply grasped with the outside of its center portion by the tire constituting member carrying mechanism, axial ends of the soft tire constituting member tend to deform into taper shapes due to rubber contraction and gravity. As a result, when the tire constituting member is about to be fitted on the tire forming drum, the member and the drum interfere with each other to lower the operational efficiency.

SUMMARY OF THE INVENTION

It is an object of the invention to provide a transfer apparatus for tire constituting members, which improves its operation efficiency by making easy the fitting of a tire constituting member onto a post-process drum.

In order to accomplish this object, the transfer apparatus for tire constituting members which are transferred from a pre-process drum to a post-process drum according to the invention, comprises a movable frame movable between the pre-process drum and the post-process drum, a holder mounted on the movable frame to be able to outwardly surround and grasp the tire constituting member, and a correction mechanism mounted on the holder on a near side to the post-process drum to expand an axial end of the tire constituting member on a near side to the post-process drum for correcting the tire constituting member into a substantially cylindrical shape.

In order to transfer the tire constituting member from the pre-process drum to the post-process drum, after the movable frame has been moved so as to approach the pre process drum, the tire constituting member is outwardly surrounded and grasped by the holder. The movable frame is then moved to the post-process drum to transfer the tire constituting member from the pre-process drum to the post-process drum. In this case, both axial ends of the soft tire constituting member are likely to deform into tapered shapes by rubber contraction and by gravity because both the ends are not restrained.

According to the invention the axial end of the tire constituting member on the near side to the post-process drum is expanded to correct into a substantially cylindrical shape by the correction mechanism, thereby completely preventing any interference between the tire constituting member and the post-process drum upon starting the fitting of the member with the drum. Therefore, the tire constituting member can be easily fitted on the post-process drum to improve operation efficiency.

Moreover, even if the axial end of the tire constituting member on the near side to the pre-process drum is deformed in a tapered shape, there is no problem because the end is forced to be expanded from inside to outside by the post-process drum in fitting the member onto the drum. However, another correction mechanism substantially the same as the correction mechanism above described may be provided to correct the axial end near to the pre-process drum into a cylindrical shape.

After termination of the correction of the end of the member, the movable frame is returned to an initial position to complete the transferring operation.

The invention will be more fully understood by referring to the following detailed specification and claims taken in connection with the appended drawings.

BRIEF DESCRIPTION OF THE DRAWINGS

FIG. 12 is a sectional view taken along the lines XII—XII in FIG. 11;

FIG. 13 is an elevation viewed in direction of arrows of XIII—XIII in FIG. 3;

FIG. 14 is an elevation viewed in directions of arrows of XIV in FIG. 13; and

FIGS. 15a–15f are explanatory views for explaining the operations of the apparatus according t the invention.

EXPLANATION OF THE PREFERRED EMBODIMENTS

Figure 1:
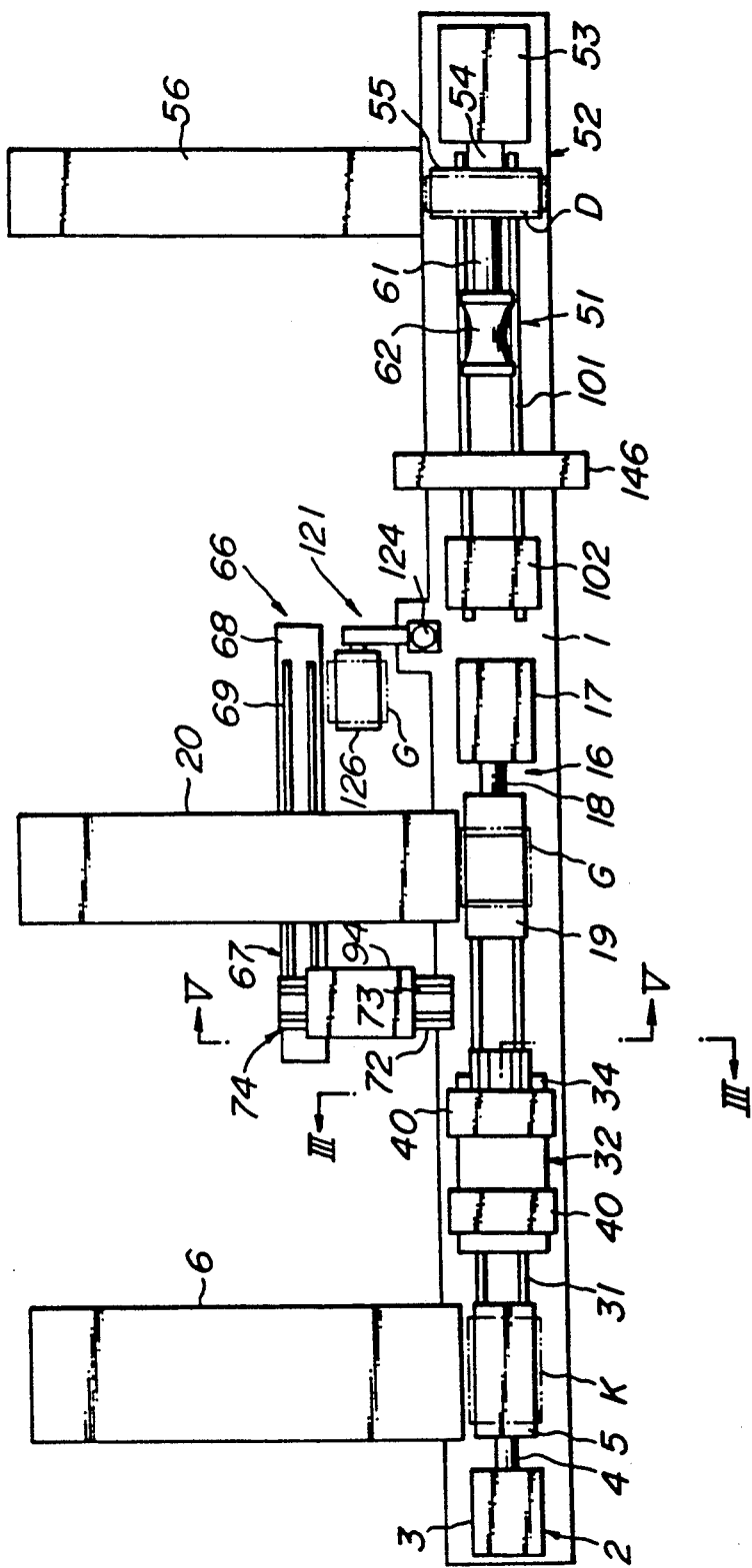
FIG. 1 is a schematic plan view illustrating an entire apparatus of one embodiment according to the invention.
Figure 2:
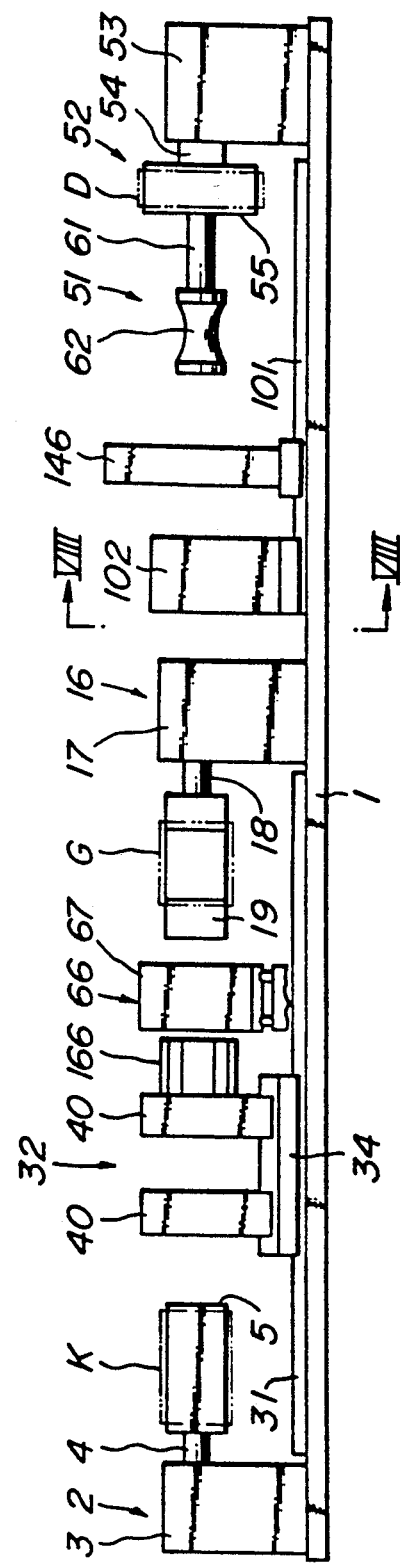
FIG. 2 is a schematic front view illustrating an entire apparatus shown in FIG. 1.

Referring to FIGS. 1 and 2, an apparatus according to the invention comprises a flat base 1 extending along a direction feeding tire constituting members and having a front end provided with a carcass band forming unit 2. The carcass band forming unit 2 comprises a main shaft 4 adapted to be rotatively drive by driving means 3 and a carcass band forming drum 5 expansible and contractible as a pre-process drum.

Terms "front" or "rear" used herein are intended to mean the upstream or downstream side of the direction feeding tire constituting members.

There is provided on one lateral side of the base a servicer 6 which successively supplies an inner liner 7 and a carcass 8 and chafer and the like if required to the carcass band forming drum 5 to attach them onto the drum 5, thereby forming a carcass band K as a cylindrical tire constituting member (FIG. 15a).

On the rear side of the carcass band forming unit 2 on the base 1, there is provided a first forming unit 16 for forming cylindrical green cases G (or other kinds of tire constituting members). The first forming unit 16 comprises a first forming drum 19 as a post-process drum and a main shaft 18 horizontally forwardly extending from first driving means 17 and rotatively driven thereby. The first forming drum 19 is coaxial to the carcass band forming drum 5 and expansible and contractible.

Figure 15C:
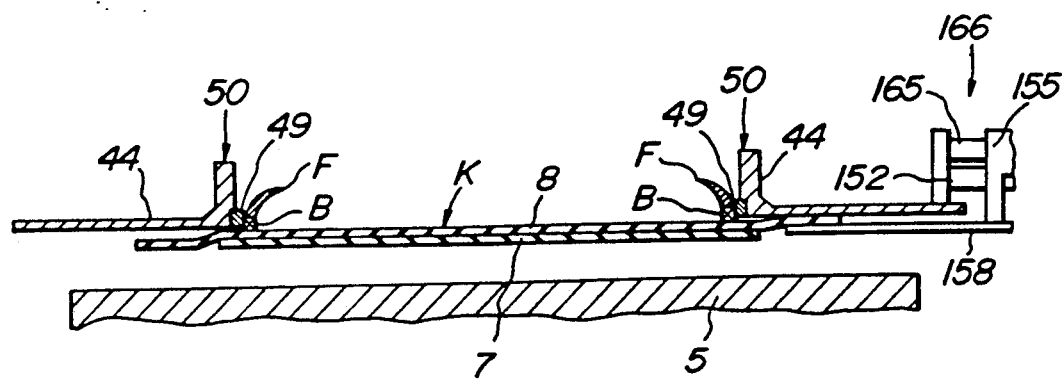
Figure 15D:
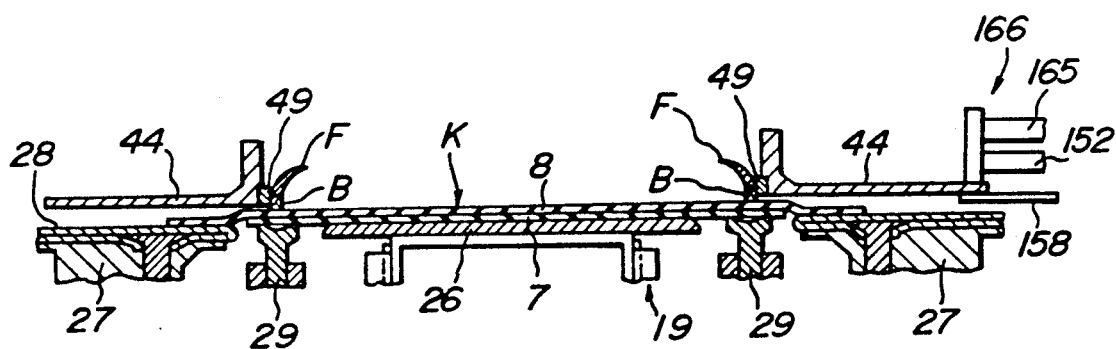

A servicer 20 is provided on the lateral side of the base 1 for supplying side treads to the first forming drum 19 to attach them about the carcass band K on the first forming drum 19. The first forming drum 19 comprises a plurality of arcuate segments 26 at its axial center portion as shown in FIG. 15d. These arcuate segments 26 form as a whole a cylindrical configuration and are simultaneously radially moved in synchronism with each other.

The first forming drum 19 is provided at axial ends with bladder supports 27 to which expansible and contractible bladders 28 are secured, respectively. Between the arcuate segments 26 and the bladder supports 27 there are provided a plurality of bead locking members 29 which are moved in radial directions in synchronism with each other and moved in axial direction through equal distances. A first forming is effected by a two-stage forming operation at the carcass band forming unit 5 and the first forming drum 19.

Figure 3:
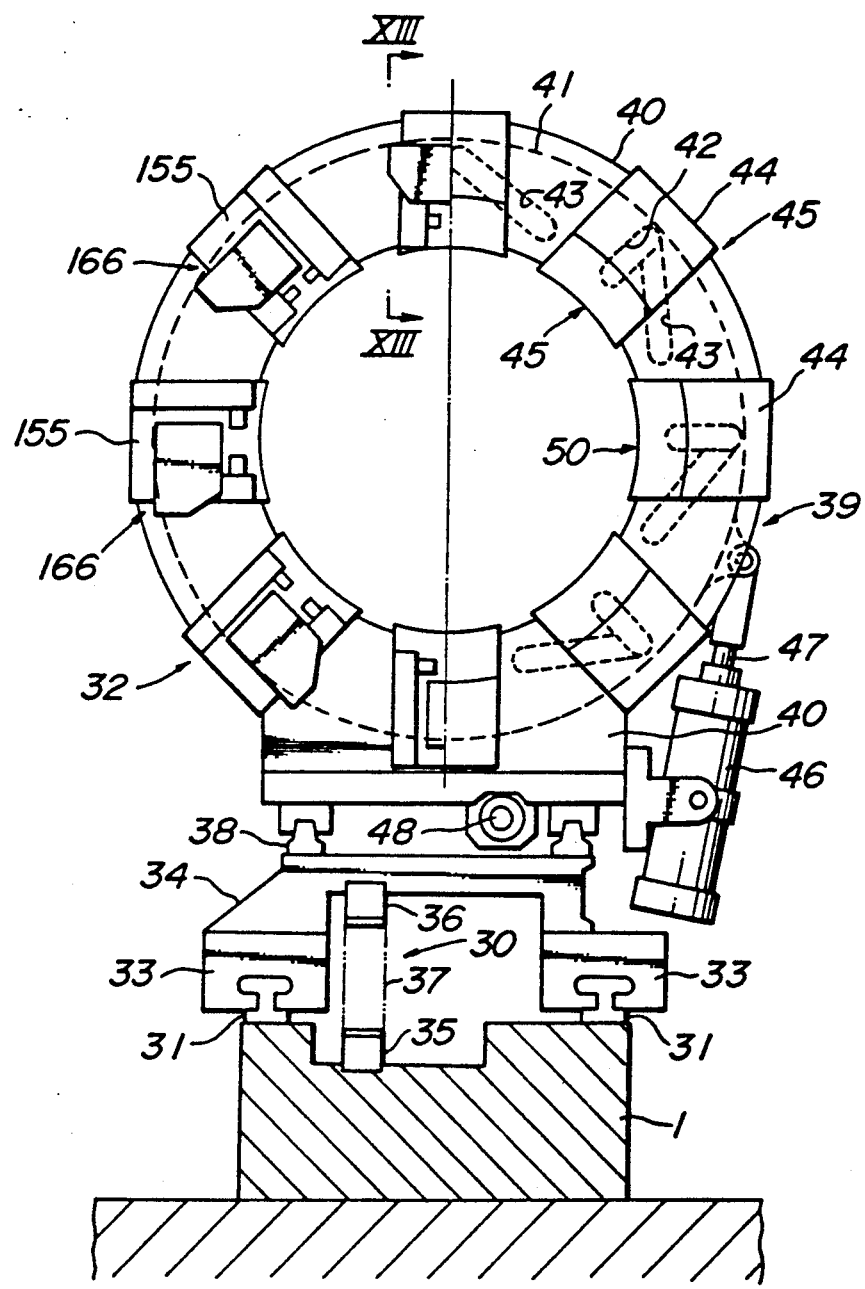
FIG. 3 is a sectional view taken along the line III—III in FIG. 1.

Referring again to FIGS. 1 and 2, between the carcass band forming unit 2 and the first forming unit 16 on the base 1, are arranged rails 31 on which is movably supported first transfer means 32 for transferring soft carcass bands K from the carcass band forming drum 5 to the first forming drum 19. As shown in FIG. 3, the first transfer means 32 comprises a movable trolley 34 having slide bearings 33 secure thereto and movable along the rails 31 with the aid of the slide bearings 33 engaging the rails 31.

Racks 35 and 36 in parallel with the rails 31 are secured to an upper surface of the base 1 and a lower surface of the movable trolley 34, respectively. A pinion 37 is in mesh with both the racks 35 and 36. When the pinion 37 is moved in an axial direction by means of a cylinder (not shown), the first transfer means 32 is moved between the carcass band forming drum 5 and the first forming drum 19. The racks 35 and 36, the pinion 37 and the cylinder (not shown) form as a whole a driving mechanism 30.

Rails 38 in parallel with the rails 31 are arranged on an upper surface of the movable trolley 34. A pair of annular members 40 are slidably supported on the rails 38. Each of the annular members 40 has a cam ring 41 rotatably supported thereby and is formed with a plurality of radially extending slits 42. On the other hand, the cam ring 41 is formed with a plurality of oblique slits 43. The movable trolley 34, the annular members 40 and the cam rings 41 form as a whole a movable frame 39 movable between the carcass band forming drum 5 and the first forming drum 19.

A plurality of pusher segments 44 are radially movably supported by each of the annular members 40 The pusher segments 44 are arranged equally circumferentially spaced to form as a whole a cylindrical shape so as to outwardly surround the carcass band K. Each of the pusher segments 44 has rollers (not shown) inserted in the slits 42 and 43. As a result, when the cam ring 41 is rotated, the pusher segments 44 are moved in radial directions in synchronism with each other so that the pusher 45 consisting of the plurality of pusher segments 44 is expanded or contracted.

Each of the annular members 40 is provided with a cylinder 46 secured thereto having a piston rod 47 whose free end is connected to the cam ring 41. As a result, when the cylinder is actuated, the cam ring 41 is rotated, while being supported by the annular member 40. A screw shaft 48 is formed with reversing screws on both sides of its center portion and arranged in parallel with the rails 38. A front and a rear end of the screw shaft 48 are threadedly engaged in the annular members 40 arranged at front and rear sides. As a result, when the screw shaft 48 is rotated, the pair of annular members 40 are moved in opposite directions through equal distances so that the annular members 40 are moved toward and away from each other.

Permanent magnets 49 are secured to inner ends of the pusher segments 44 in opposition to each other for holding beads B having fillers F by means of the magnetic attractive force of the magnets 49 (FIG. 15a). The pusher segments 44 and the permanent magnets 49 form as a whole a holder for indirectly grasping the carcass band K through beads B.

Figure 4:
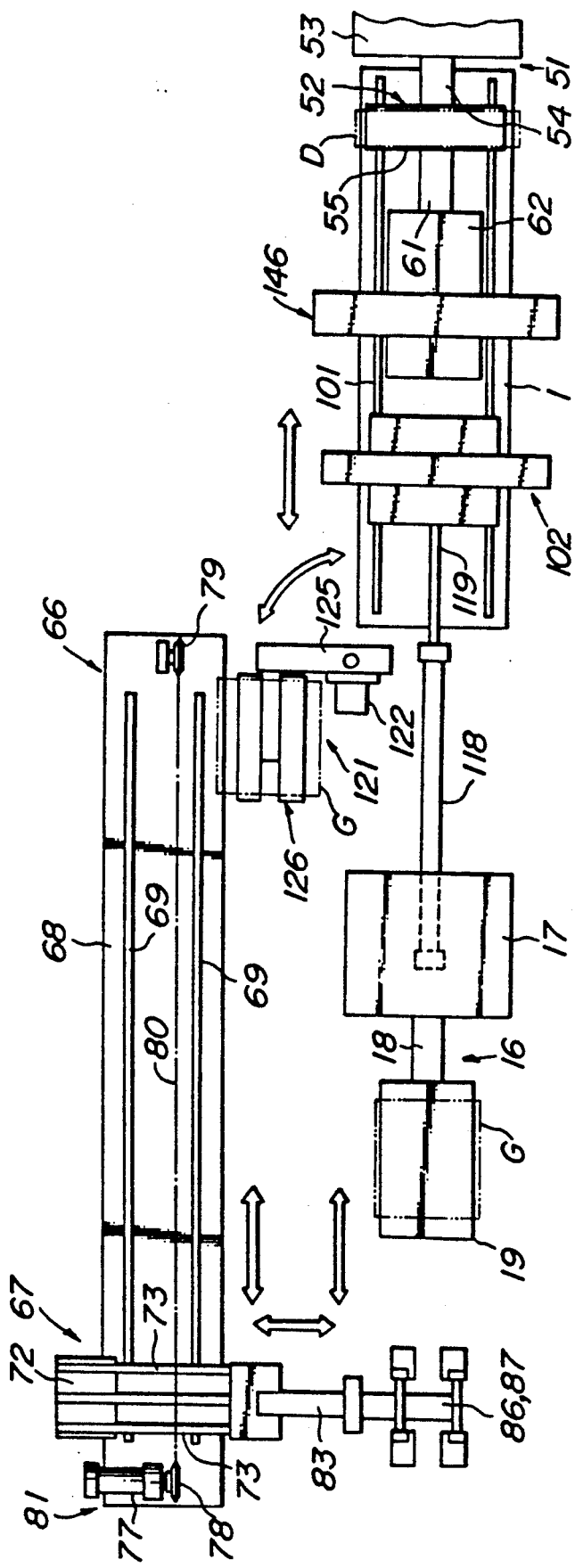
FIG. 4 is a plan view illustrating the proximity of a second transfer means used in the apparatus shown in FIG. 1.
Figure 5:
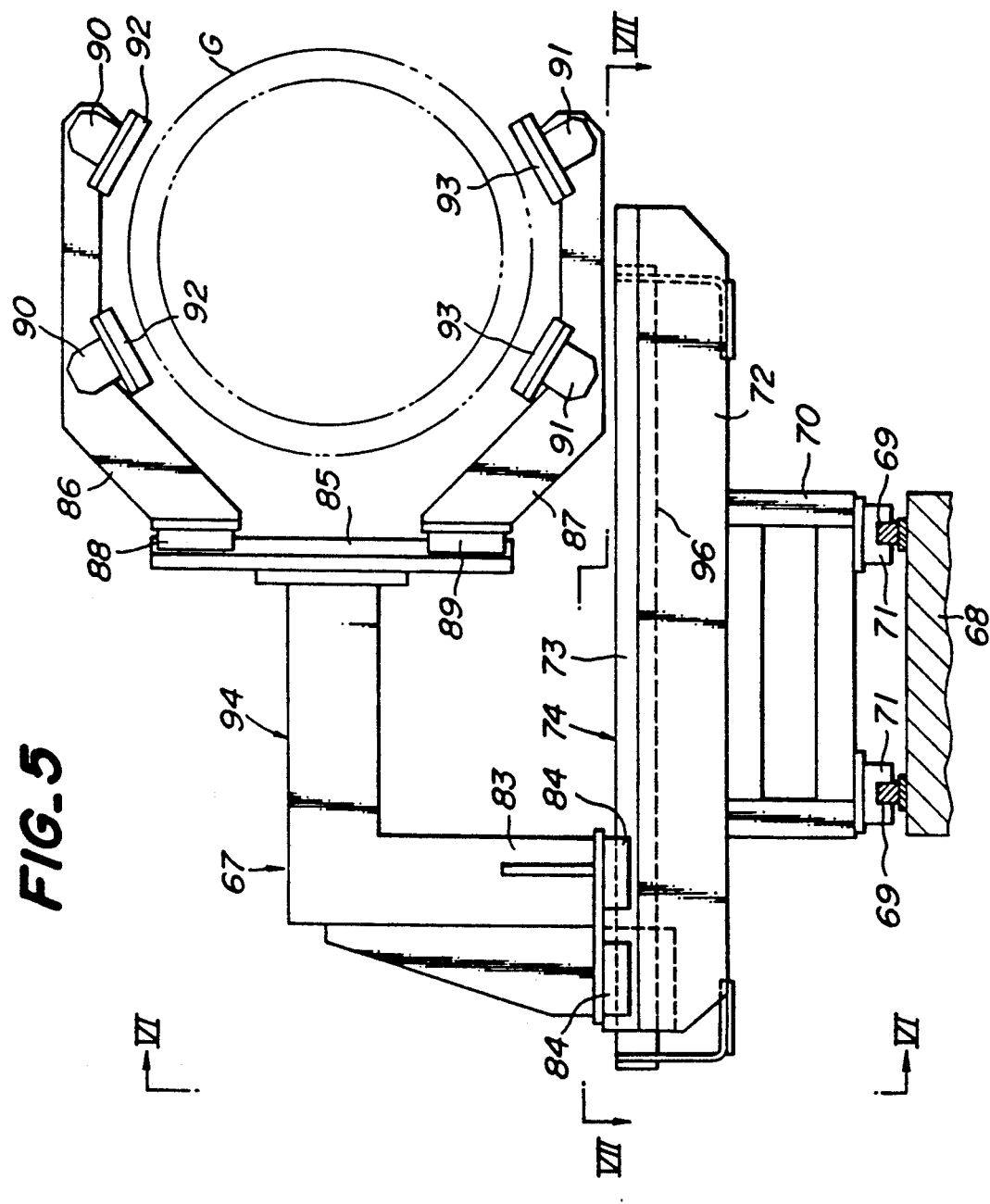
FIG. 5 is a sectional view taken along the line V—V in FIG. 1.
Figure 6:
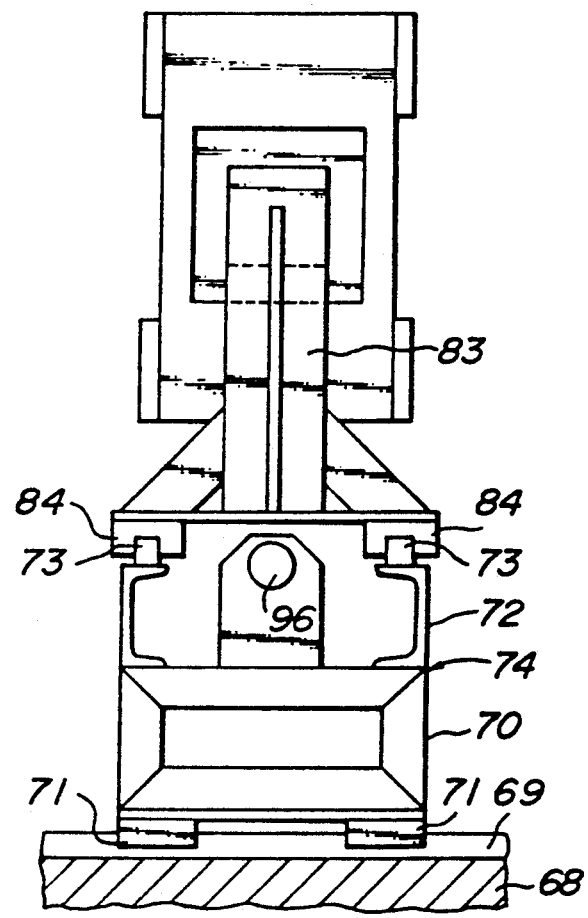
FIG. 6 is an elevation viewed in directions of arrows of VI in FIG. 5.
Figure 7:
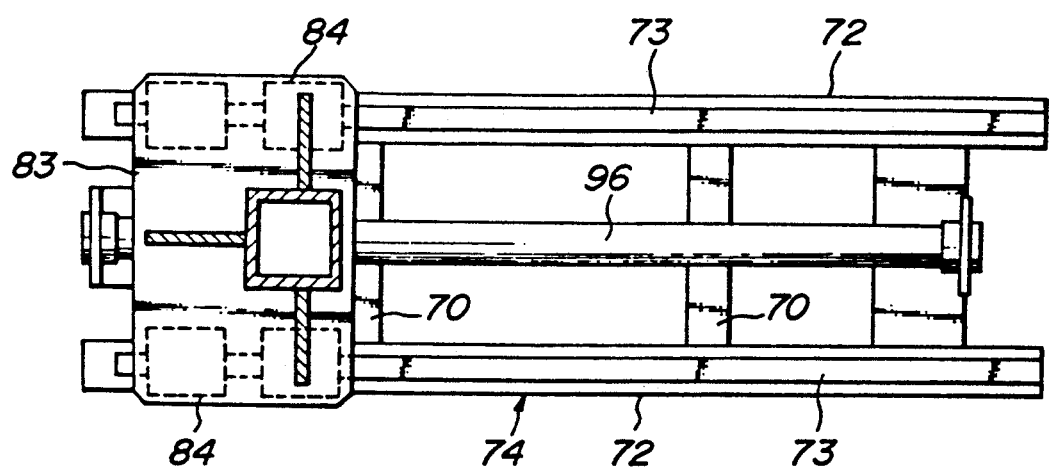
FIG. 7 is a sectional view taken along the lines VII—VII in FIG. 5.

Referring to FIGS. 1, 2 and 4, a second forming unit 51 and a band forming unit 52 are arranged on a rear side of the first forming unit 16 on the base 1 for effecting a second forming by a two-stage forming operation. The second forming unit 51 and the band forming unit 52 have second driving means 53 as a common driving means. A hollow shaft 54 of the band forming unit 52 is rotatively driven by the second driving means 53. The hollow shaft 54 is provided at it end with an expansible and contractible band forming drum 55. A servicer 56 is arranged on a lateral side of the band forming drum 55 for successively supplying a belt and a tread to band forming drum 55. The belt and tread are attached in succession onto a circumference of the band forming drum 55 to form a belt-tread band D.

A second forming drum 62 of the second forming unit 51 and a main shaft 61 of the second forming unit 51 extend forwardly from the second driving means 53 and are rotatively driven by the second driving means 53. The main shaft 61 extends through the hollow shaft 54. Moreover, the second forming drum 62 is arranged at the end of the main shaft 61 on an immediately front side of the band forming drum 55 in a manner to be coaxial to both the band forming drum 55 and the first forming drum 19. The second forming drum 62 serves to deform a green case G transferred from the first forming drum 19 into a toroidal shape. The first and second forming drum 19 and 62 extend in the same direction from the first and second driving means 17 and 53, respectively.

Second transfer means 66 serving as green case transfer means is arranged adjacent the first and second forming units 16 and 51 and movable between the first and second forming drums 19 and 62. The second transfer means 66 serves to transfer the green case G formed at the first forming drum 19 to the second forming drum 62 and load the green case G thereon. The second transfer means 66 has a first transporting mechanism 67 on a green case transfer path on a side nearer to the first forming unit 16.

A base 68 is arranged on a lateral side of the first forming drum 19. As shown in FIGS. 4, 5, 6 and 7, a pair of rails 69 are arranged in parallel with the axis of the first forming drum 19 on the base 68. Above the base 68 is provided a lower frame 70 having slide bearings 71 which are provided on a bottom surface of the lower frame 70 and slidably engage the rails 69. On the lower frame 70 is mounted an upper frame 72 horizontally extending in a direction perpendicular to the axis of the first forming drum 19. A pair of rails 73 are arranged on an upper surface of the upper frame 72.

The lower frame 70, the slide bearings 71, the upper frame 72 and the rails 73 are arranged as a whole on a lateral side of the first forming drum 19 to form a carriage 74 movable in axial directions of the first forming drum 19 in a horizontal plane.

A pneumatic motor 77 is fixed to a front end of the base 68. A chain 80 extends about a sprocket 78 provided on an output shaft of the pneumatic motor 77 and a sprocket 79 supported on a rear end of the base 68. A mid portion of the chain 80 is fixed to the carriage 74. As a result, when the pneumatic motor is energized to drive the chain 80, the carriage 74 is moved in axial directions of the first forming drum 19 in the horizontal plane. The pneumatic motor 77 and the sprockets 78 and 79 form as a whole a moving mechanism 81 for moving the carriage 74 in the axial directions of the first forming drum 19.

Above the carriage 74 is provided a cross slide 83 which is L-shaped and whose upper portion extends onto the other lateral side on the side of the first forming drum 19. To a lower end of the cross slide 83 is fixed slide bearings 84 adapted to engage the rails 73. The cross slide is provided on the other lateral side with a vertically extending rail 85.

A pair of grasping arms 86 and 87 are provided on the cross slide 83 on the lateral side spaced one above the other. Slide bearings 88 and 89 are fixed onto one ends of the grasping arms 86 and 87, respectively, which are adapted to slidably engage the rail 85. The grasping arms 86 and 87 are vertically moved in synchronism with each other equal distances toward or away from each other by means of cylinders (not shown). The grasping arms 86 and 87 are provided with a plurality of holders 90 and 91, respectively, for outwardly grasping the green case G. Cushion blocks 92 and 93 are fixed to inner surfaces of the holders 90 and 91 in opposition to each other.

The cross slide 83, the slide bearings 84, the rail 85, the grasping arms 86 and 87, the holders 90 and 91, and the cushion blocks 92 and 93 are supported as a whole by the carriage 74 and form a grasping unit 94 for outwardly grasping the green case G. The grasping unit 94 is movable in a horizontal plane along the rails 73 in the directions perpendicular to the axial direction of the first forming drum 19. A center of a circle passing through all the holders 90 and 91 is located on a center axis of the grasping unit 94.

To the upper frame 72 is fixed a rodless cylinder 96 extending in parallel with the rails 17. A slider as an output side of the rodless cylinder 96 is fixed to the cross slide 83. As a result, when the rodless cylinder 96 is actuated the grasping unit 94 is moved in a horizontal plane in directions perpendicular to the axial direction of the first forming drum 19. The carriage 74, the moving mechanism 81, the grasping unit 94 and the rodless cylinder 96 form as a whole the first transporting mechanism 67 which is arranged between the first forming drum 19 and a support holder later described. The first transporting mechanism 67 outwardly grasps the green case G received from the first forming drum 19 and moves in a horizontal plane together with the green case G so that the green case G is transferred to the holder.

Referring to FIGS. 1, 2, 4, 8 and 9, a pair of rails 101 are arranged on the bed 1 between the first and second driving means 17 and 53 and extend in the axial direction of the second forming drum 62. A second transporting mechanism 102 is provided on the transfer path of the green case G on the side near the second forming unit 51 and on the rails 101 between the first and second driving means 17 and 53. The second transporting mechanism 102 comprises a ring member 104 substantially in the form of a ring which is coaxial to the second forming drum 62 and has slide bearings 103 secured thereto engaging the rails 101.

The ring member 104 rotatably supports a plurality of rollers 105 by which is rotatably supported a cam ring 106 in the form of a ring coaxial to the ring member 104. The ring member 104 is formed with a plurality of radially extending slits 107. On the other hand, the cam ring 106 is also formed with a plurality of inclined slits 108. Radially extending guide rails 109 are fixed to the ring member 104 near the slits 107, respectively. A movable plate 111 is radially movably supported through a slide bearing 110 by each of the guide plates 109.

A grasping segment 112 in the form of an arcuate shape extending along the cam ring 106 is fixed to a radially inner end of each of the movable plates 111. A pin 113 is fixed to each of the movable plates 111 in a manner passing through the slit 107 of the ring member 104 and the slit 108 of the cam ring 106. The pin 113 supports a roller 114 adapted to be in rolling contact with inner surfaces of the slit 108. As a result, when the cam ring 106 is rotated, the movable plates 111 are radially moved in synchronism with each other, with the result that the grasping segments 112 expand or contract as a whole. When the grasping segments 112 have contracted, they outwardly grasp the green case G.

To a lower portion of the ring member 104 is connected a cylinder 115 having a piston rod 116 whose distal end is connected to the cam ring 106. Therefore, when the cylinder 115 is actuated, the cam ring 106 is rotated. The second transporting mechanism 102 is formed by the slide bearings 103, the ring member 104, the rollers 105, the cam ring 106, the guide rails 109, the slide bearings 110, the movable plates 111, the grasping segments 112, the pins 113, the rollers 114 and a cylinder 115. The second transporting mechanism 102 is arranged between the second forming drum 62 and the support holder, later described, so that the second transporting mechanism 102 receives the green case G from the holder and then moves in the horizontal plane together with the green case G to transfer it to the second forming drum 62.

A cylinder 118 is arranged on the front side of the second transporting mechanism 102 and extending in the axial direction of the second forming drum 62. The cylinder 118 has a piston rod 119 whose distal end is connected to the ring member 104. As a result, when the cylinder 118 is actuated, the second transporting mechanism 102 is moved in its axial direction keeping the coaxial relation with the second forming drum 62.

Referring to FIGS. 1, 2, 4, 10, 11 and 12, a turning grasping mechanism 121 is arranged between the first and second transporting mechanisms 67 and 102 and more particularly on lateral rear side of the first forming drum 19 for temporarily inwardly holding the green case G. The turning grasping mechanism 121 comprises a turning shaft 124 rotatably supported through a pillow block 123 by a vertical post 122. The turning shaft 124 has a horizontal arm 125 fixed thereto whose distal end has a support holder 126 fixed to and perpendicularly extending to the arm 125. The support holder 126 has a center shaft 131 fixed to the arm 125 and a slider 132 supported by the center shaft 131 movably in axial directions of the center shaft 131.

A plurality of grasping segments 133 are arranged outside of the slider 132. These grasping segments 133 have arcuate sectional shapes in a circle having a center coincident with an axis of the center shaft 131. Plural pairs of parallel links 134 and 135 are arranged whose inner ends are connected to the slider 132 and outer ends are connected to the grasping segments 133. These links 134 and 135 are rocked in synchronism with each other by movement of the slider 132. The grasping segments 133 are radially moved in synchronism with each other to expand or contract their diameter as a whole. A plurality of links 136 are provided whose inner ends are pivotally connected to the center shaft 131 and outer ends are pivotally connected to centers of the links 134.

To the arm 125 through brackets 138 are connected a plurality of cylinders 137 having piston rods 139 whose distal ends are connected through brackets 140 to the slider 132. As a result, when the cylinders 137 are actuated to move the slider 132 in the axial direction of the center shaft 131, the links 134, 135 and 136 are rocked in synchronism with each other to expand or contract the diameter of the grasping segments 133. When the diameter of the grasping segments 133 expands, the green case G is inwardly grasped by the expanded grasping segments 133. The center shaft 131, the slider 132, the grasping segments 133, the links 134, 135 and 136 and the cylinder 137 form as a whole the support holder 126.

The turning shaft 124, the arm 125 and the support holder 126 form as a whole the turning grasping mechanism 121 which is able to rotate about the turning shaft 124 through 180° in the horizontal plane by means of a rotary actuator (not shown) connected to the turning shaft 124. The turning grasping mechanism 121 can assume a first position P as an extremely rotated position where the support holder 126 of the turning grasping mechanism 121 is coaxial to the grasping unit 94 of the first transporting mechanism 67, and a second position Q as the other extremely rotated position where the support holder 126 of the turning grasping mechanism 121 is coaxial to the second transporting mechanism 102.

On the rails 101 is slidably supported a third transporting mechanism 146 which is movable along the rails 101 at least between the second forming drum 62 and the band forming drum 55 and in this embodiment further between the second forming drum 62 and the first forming unit 16. The third transporting mechanism 146 outwardly grasps the band D received from the band forming drum 55 and moves in the horizontal plane together with the band D to transfer the band D to the radial outside of the green case G on the second forming drum 62.

Referring to FIGS. 1, 2, 3, 13 and 14, to a rear end of the holder 50 supported by the annular member 40 on the rear side or nearer to the first forming drum 19 are fixed radially extending brackets 151 to which are fixed mounting beams 152 extending toward the first forming drum 19. A rail 153 is secured to an outer surface of each of the mounting beams 152. A substantially U-shaped movable block 155 is supported on the rail 153 movably in axial directions of the holder 50. To an inner end of each of the movable blocks 155 are connected through a pin 156 a pair of rocking members 157. To the rocking members 157 are fixed rear ends of correction arms 158 substantially equal in length to and in parallel with the mounting beams 152.

Cam plates 159 and 160 are fixed spaced from each other in front and rear directions to radially inner surfaces of the mounting beams 152. The cam plates 159 and 160 have inclined surfaces on their opposite sides. Cam followers 161 are rotatably supported through mounting shafts 162 by the rocking members 157 on the rear sides of the pins 156. Springs 164 are interposed between the mounting shafts 162 and pins 163 fixed to the movable block 155. With this arrangement, the rocking members 157, the correction arms are urged in a counterclockwise direction viewed in FIG. 13 so that the cam followers 161 are urged against the inner surfaces of the mounting beams 152 and the cam plates 159 and 160.

A rodless cylinder 165 is fixed to the brackets 151 and extends in parallel with the mounting beams 152. A slider of the rodless cylinder 165 is connected to the movable block 155. As a result, when the rodless cylinder 165 is actuated to move the movable block 155 forwardly along the rail 153 toward the bracket 151, the cam follower 161 successively contacts the cam plate 160, the inner surface of the mounting beam 152 and the cam plate 159. Therefore, the correction arms 158 forming as a whole a cylinder are radially inwardly rocked from a released position where they are substantially parallel to the mounting beam 152 shown in solid lines in FIG. 13 to a tapered position where they form a tapered or conical cylinder shown in phantom lines in the drawing. The correction arms 158 are radially outwardly rocked so that they are brought into a position substantially the same as the released position.

In this manner, a correction mechanism 166 is partially formed as a whole by the bracket 151, the mounting beam 152, the rail 153, the movable block 155, the rocking members 157, the correction arms 158, the cam plates 159 and 160, the cam followers 161, the mounting shafts 162, the pins 163, the springs 164 and the rodless cylinder 165. The correction mechanism 166 serves to expand an axial rear end of the carcass band K adjacent the first forming drum 19 to correct the shape of the carcass band K the in transferring operation.

The operation of the apparatus according to the invention will be explained hereinafter.

First, an inner liner 7 and carcass 8 are successively supplied from the servicer 6 onto the rotating carcass band forming drum 5 so that these tire members 7 and 8 are attached to an outer circumference of the drum 5 to form a cylindrical carcass band K. At this moment, a pair of beads with fillers F are supplied from a bead supply source (not shown) to the holder 50 and held by means of the permanent magnets 49 with the aid of the magnetic attractive force. When the carcass band K has been formed in the above manner, the first transfer means 32 is forwardly moved to a position where the holders 50 of the first transfer means 32 surround the outer circumference of the carcass band K. As a result, the beads B held by the holders 50 are transferred to predetermined positions radially outward of the carcass band K.

The carcass band forming drum 5 is then expanded together with the carcass band K so that inner circumferences of the pair of the beads B are pressed against the outer circumference of the carcass band K. Therefore, the beads B with the fillers F are set on the outer side of the carcass band K at its center as shown in FIG. 15b so that the carcass band K and the beads B are integrally united. Thereafter, the carcass band forming drum 5 is contracted to remove the carcass band forming drum 5 from the carcass band K and the integrally united carcass band K and the beads B with the fillers F are received by the first transfer means 32 as shown in FIG. 15c.

Thereafter, the first transfer means is moved rearwardly together with the carcass band K outwardly grasped thereby to transfer the integrally united carcass band K and the beads B with the fillers F to a position on the radial outside of the first forming drum 19 as shown in FIG. 15d. During such transferring, the carcass band K, the holders 50 outwardly grasp only partially the axial center of the soft carcass band K. That is, the carcass band K is indirectly grasped through a pair of beads B with the fillers F without restraining the axial ends of the carcass band K so that the axial ends would deform into tapered shapes by contraction of the rubber and by gravity.

In this embodiment, therefore, immediately after the carcass band K has been removed from the carcass band forming drum 5, the rodless cylinders 165 are actuated to move the movable blocks forwardly toward the bracket 151 so that the correction arms 158 are caused to enter the pusher segments 44. By the forward movement of the movable blocks 155 the cam followers 161 successively contact the cam plates 160, the inner surfaces of the mounting beams 152 and the cam plates 159 so that the correction arms 158 rock inwardly from the opened to closed condition and again rock outwardly into the opened condition. As the correction arms 158 rock while entering the pusher segments 44 the end of the carcass band K nearer to the first forming drum 19 is expanded from its inside so that the shape is corrected into a substantially cylindrical shape. Therefore, when the carcass band K is fitted on the first forming drum 19, the fitting operation is easily effected without any interference of the carcass band with the first forming drum 19.

In this case, the other end of the carcass band K nearer to the carcass band forming drum 5 has deformed in a tapered shape. However, since the tapered end of the carcass band K will be expanded by the first forming drum 19 immediately before the completion of the fitting of the carcass band K on the first forming drum 19, the fitting is smoothly effected without any trouble. It is recognized that a correction mechanism substantially the same as the mechanism above described may be provided for the purpose of correcting the other end of the carcass band K.

The arcuate segments 26 of the first forming drum 19 are slightly radially outwardly moved in synchronism with each other to deliver the integrally united carcass bank K and the beads B having the fillers F onto the first forming drum 19. In this manner, as the carcass band K and the beads B with the fillers F are pressed against each other to unite them immediately after the formation of the carcass band K, there is no risk of variance in relative positions between them, for example, axial positions, concentricities and the like even if they are transferred or delivered after they have been integrally united.

Thereafter, the rodless cylinders 165 of the correction mechanism 166 are actuated to move the movable blocks 155 rearwardly so that the correction arms 158 are move from the carcass band K and returned to their original positions. At this moment, the bead locking members 29 radially outwardly moved in synchronism with each other so that outer circumferences of the bead locking members 29 are pressed through the carcass band K against the inner circumferences of the beads B having the fillers F. Therefore, the beads B with the fillers F are inwardly grasped by the bead locking members 29 to be strongly positioned and fixed thereat. When the piston rod 47 of the cylinder 46 is then extended to rotate the cam ring 41, the pusher segments 44 are radially outwardly moved in synchronism with each other so that the beads B are released from the attractive forces of the permanent magnets 49.

Thereafter, the arcuate segments 26 of the first forming drum 19 are moved radially outwardly in synchronism with each other to expand the axial center of the carcass band K radially outwardly. As the bead locking members 29 are moved toward each other during such an expansion, parts of the carcass band K between the beads B and shoulders of the arcuate segments 26 are folded radially inwardly while being given constant tensile forces as shown in FIG. 15e.

Thereafter, the bladders 28 are supplied with compressed air to be expanded, so that the folded portions 171 of the carcass band K positioned axially outwardly of the beads B are expanded into the form of a frustocone. Under this condition, the screw shaft 48 is rotated to move the holders 50 toward each other. As a result, the bladders 28 embraced between the pusher segments 44 and the arcuate segments 26 are moved toward each other while the bladders 28 are being rolled and deformed therebetween. Therefore, both the axial ends of the carcass band K or the folded portions 171 are folded or turned up about the beads B as shown in FIG. 15f. In this manner, the folded portions 171 of the carcass band K are folded by means of the bladders 28 and the pusher segments 44 of the first transfer means 32 in cooperation with each other. In this case, the beads B are inwardly grasped by the bead locking members 29 of the first forming drum 19 to be positioned and fixed thereat. Therefore, the beads B are not moved even they are subjected to great external forces from the bladders 28 and the like during the turning up of the folded portions 171.

As explained therein, according to the invention after the carcass band K and the beads B are integrally united, they are transferred and delivered, and before the folded portions are turned up, the beads B are positioned and fixed. It is therefore possible to prevent the variance in relative positions between the carcass band K and the beads B, for example, axial positions, concentricities and the like. As a result, tires can be produced which are particularly superior in uniformity.

The bladders 28 are then contracted and the first transfer mean 32 is moved to a waiting position between the carcass band forming unit 2 and first forming unit 16. Pusher segments 44 of the first transfer means 32 are returned to the initial positions. Side treads are supplied from the servicer 20 onto the rotating first forming drum 19 so as to be attached on the circumference of the carcass band K on the first forming drum 19 to form a green case G.

As can be seen from the above explanation, according to the invention the forming the carcass band K and sitting the beads B having the fillers F are effected at the carcass band forming drum 5, while the folding the carcass band K and attaching the side treads are effected at the first forming drum 19. The number of the operations at the first forming drum 19 is reduced by that corresponding to bead setting so that the cycle time at the first forming drum 19 is shortened in comparison with the prior art. On the other hand, the number of the operations at the carcass band forming drum 5 is increased by that corresponding to bead setting so that the cycle time at the carcass band forming drum 5 is prolonged. As a result, the cycle time of the carcass band forming drum 5 becomes substantially equal to that of the first forming drum 19.

In this case, the operations at the carcass band forming drum 5 and the first forming drum 19 are continuous so that either of the two cycle times according to whichever is longer forms an ultimate cycle time. Since the cycle times at both the drums 5 and 19 are substantially equal in this embodiment, the ultimate cycle time becomes shorter to improve the operation efficiency.

The green case G is then transferred from the first forming drum 19 to the second forming drum 62. For this purpose, the rodless cylinder 96 of the first transporting mechanism 67 is actuated to move the grasping unit 94 which is moved in the horizontal plane in the lateral direction perpendicular to the axial direction of the first forming drum 19. Such movement of the grasping unit 94 is stopped when the axes of the grasping unit 94 and the first forming drum 19 become coaxial to each other. At that moment, the grasping arms 86 and 87 are positioned at the uppermost and lowermost positions which are farthest spaced, respectively.

Thereafter the pneumatic motor 77 is actuated so as to move the chain 80 to move the carriage 74 and grasping unit 94 in unison axially rearwardly toward the first forming drum 19. Since the axis of the first forming drum 19 is horizontal, the grasping unit 94 always moves in a horizontal plane. When the holders 90 and 91 of the grasping unit 94 have arrived at the position on the outer side of the green case G on the first forming drum 19, the actuation of the rodless cylinder 96 is deenergized to stop the axial movement of the carriage 74 and the grasping unit 94.

The grasping arms 86 and 87 are lowered and raised through equal distances toward each other, respectively. When the cushion blocks 92 and 93 have abutted against the outer circumference of the green case G, the grasping arms 86 and 87 are positioned and fixed thereat to outwardly grasp the green case G by means of the grasping unit 94. Under this condition, the first forming drum 19 is contracted and the green case G is delivered from the first forming drum 19 to the grasping unit 94.

Thereafter the pneumatic motor 77 is actuated to move the chain 80 so that the carriage 74 and the grasping unit 94 grasping the green case G are moved in the horizontal plane away from and in the axially forward direction of the first forming drum 19. When the carriage 74 and the grasping unit 94 have been moved at the forwardmost positions, the actuation of the pneumatic motor 77 is stopped. Thereafter, the rodless cylinder 96 is actuated to move the grasping units 94 in the horizontal plane in the lateral direction perpendicular to the axial direction of the first forming drum 19. As a result, the green case G is retracted to a position where it does not interfere with the first forming unit 16 and the grasping unit 94 is brought into coaxial to the support holder 126 awaiting at the first position P. On the other hand, with the first forming drum 19 from which the green case G has been removed the, forming operation of a next green case has been started immediately after the removal of the preceding green case G.

Thereafter, the carriage and the grasping unit 94 grasping the green case G are moved in the horizontal plane in the axially reward direction so as to pass by the side of the first forming drum 16 to approach the turning grasping mechanism 121 When the green case G grasped by the grasping unit 94 is fitted on the support holder 126, the operation of the pneumatic motor 77 is stopped.

The piston rods 139 of the cylinders 137 of the turning grasping mechanism 121 are extended to rock the links 134, 135 and 136 in a manner approaching vertical positions so that the grasping segments 133 are moved outwardly to expand the diameter of the circle defined thereby. The extension of the piston rods 139 of the cylinders 137 is stopped when the grasping segments 133 abut against the inner circumference of the green case G. Under this condition, the grasping arms 86 and 87 are raised and lowered to disengage the holders 90 and 91 from the green case G. In this manner, the green case G which has been outwardly grasped by the grasping unit 94 is delivered to the support holder 126 and inwardly grasped thereby.

Thereafter, the turning shaft 124, the arm 125 and the support holder 126 grasping the green case G are turned in unison in the horizontal plane about the turning shaft 124 through 180° from the first position P to the second position Q. When the turning operation is completed, the support holder 126 has arrived at the second position Q where the axes of the support holder 126 and the second transporting mechanism 102 are coaxial. The carriage 74 and the grasping unit 94 are moved into axially forward direction to return to their initial positions.

The cylinder 118 is then actuated to move the second transporting mechanism 102 onto the forward side of the second forming drum 62. Since the axis of the second forming drum 62 is horizontal and coaxial to the first forming drum 19, the second transporting mechanism 102 moves in the horizontal plane. Such movement of the second transporting mechanism 102 is stopped when it has been fitted on the support holder 126 positioned at the second position Q.

Figure 8:
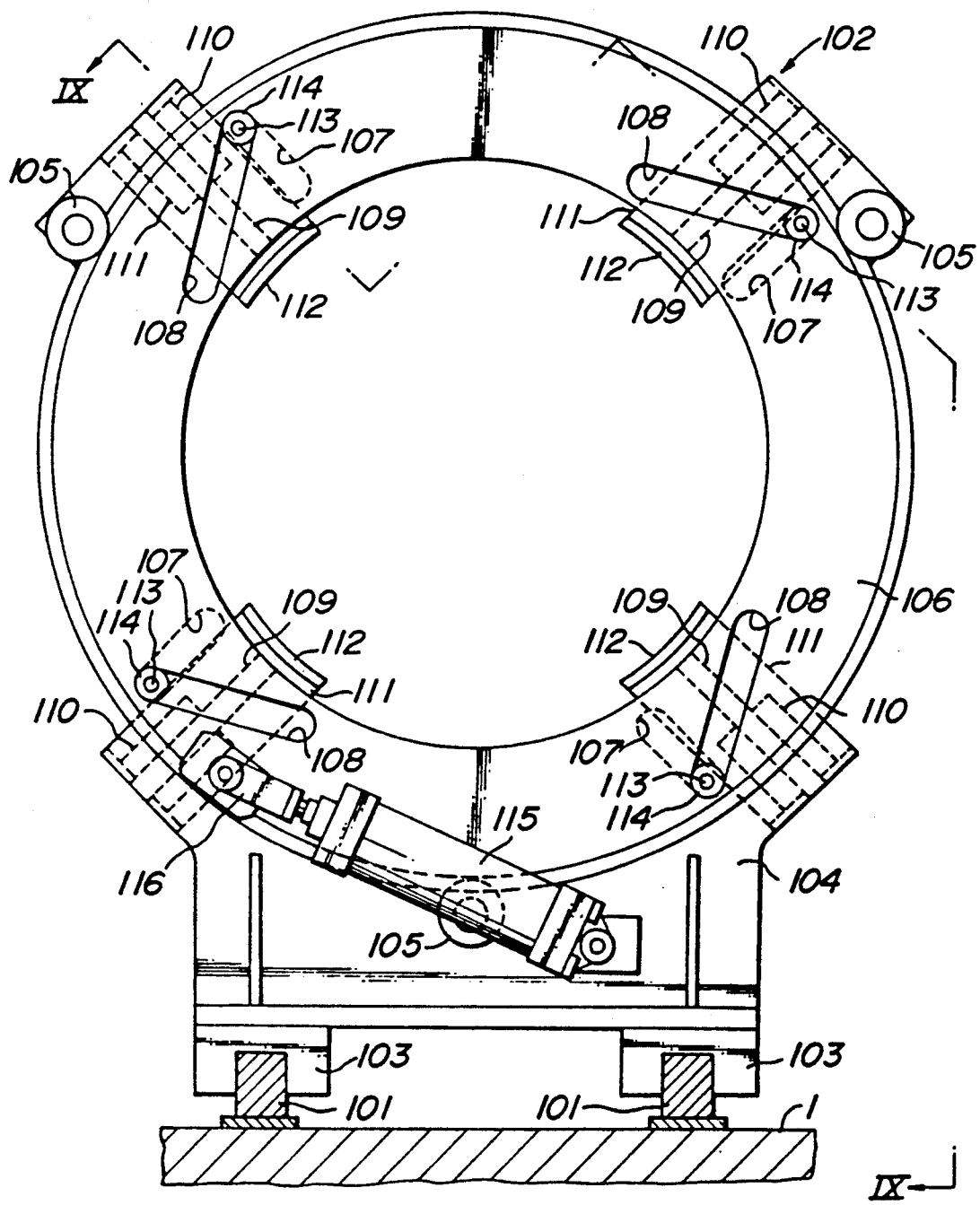
FIG. 8 is a sectional view taken along the line VIII—VIII in FIG. 2.
Figure 9:
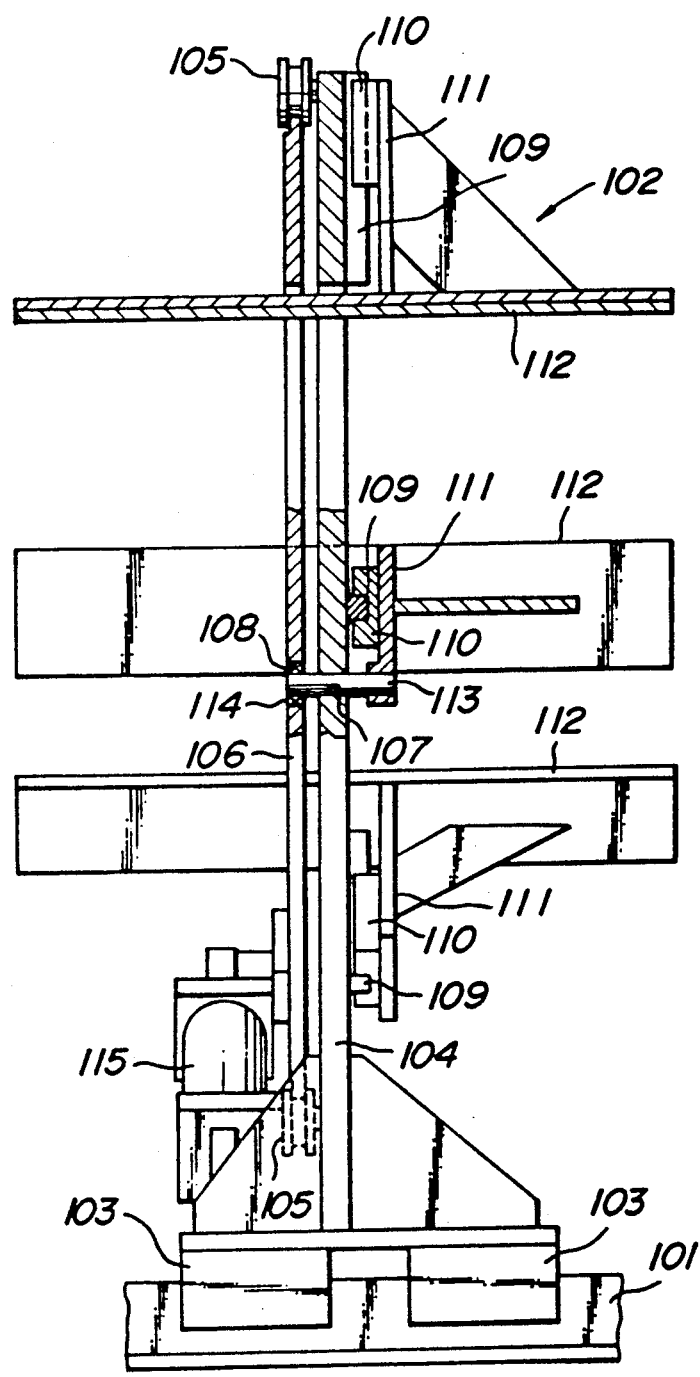
FIG. 9 is a sectional view taken along the lines IX—IX in FIG. 8.
Figure 10:
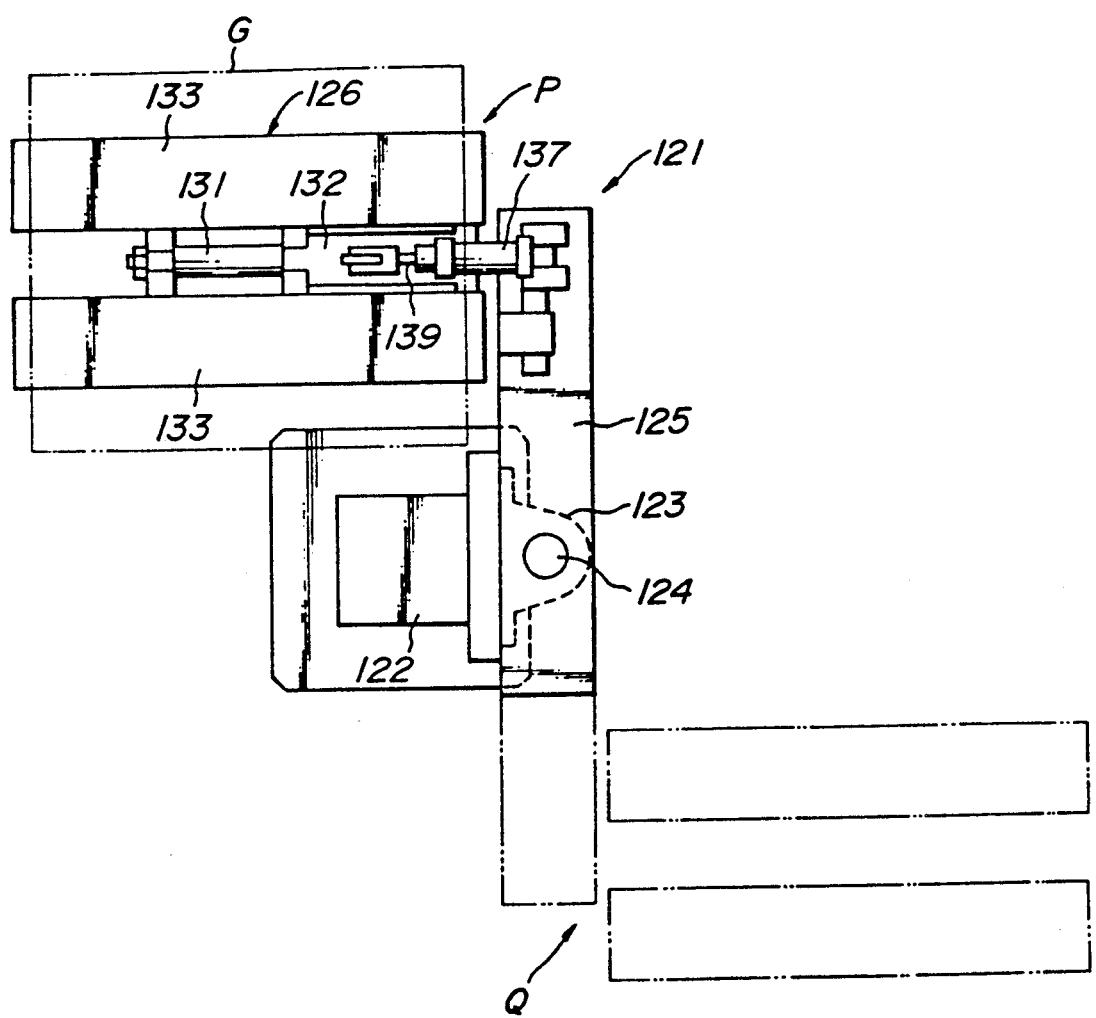
FIG. 10 is a plan view of a turning grasping mechanism used in the apparatus shown in FIG. 1.
Figure 11:
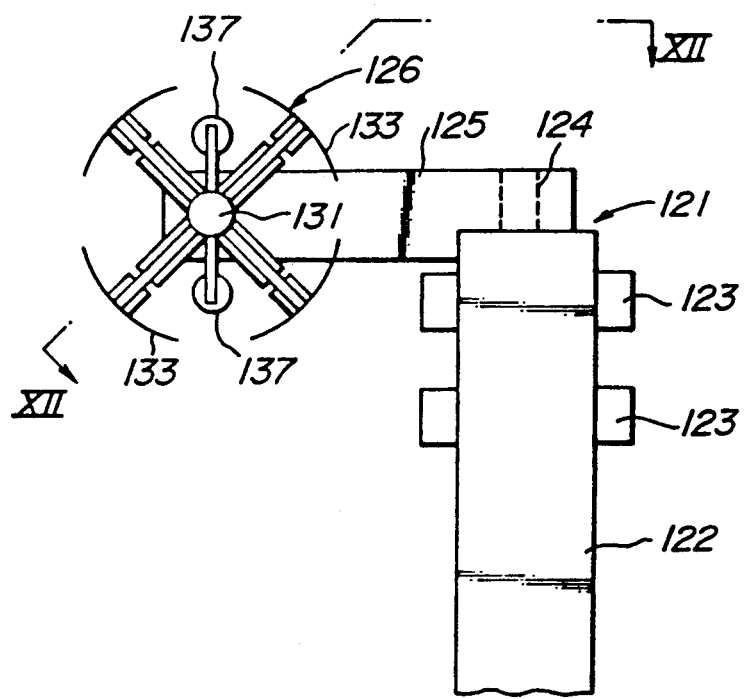
FIG. 11 is a side view of the turning grasping mechanism shown in FIG. 10.

Thereafter, the piston rod 116 of the cylinder 115 is extended to rotate the cam ring 106 of the second transporting mechanism 102 in a clockwise direction viewed in FIG. 8. As a result, all the movable plates 111 and the grasping segments 112 are moved radially inwardly in synchronism with each other. Such radially inward movements of the members are stopped when the grasping segments 112 abut against the outer circumference of the green case G. The piston rod 138 of the cylinder 137 of the turning grasping mechanism 121 is retracted to contract the diameter of the circle defined by the grasping segments 133. In this manner, the green case G is delivered from the turning grasping mechanism 121 to the second transporting mechanism 102 and outwardly grasped by the mechanism 102.

Thereafter, the piston rod 119 of the cylinder 118 is extended to move the green case G and the second transporting mechanism 102 in the horizontal plane in the axially rearward direction. During such movement, the third transfer means 146 has been retracted between the second forming drum 62 and the band forming drum 55 in order to avoid any interference of the third transfer means 146 with the second transporting mechanism 102. The movement of the second transporting mechanism 102 is stopped when the green case G has been fitted on the second forming drum 62. The turning grasping mechanism 121 is turned through 180° in the direction reverse to that above described to return to its initial position.

The second forming drum 62 is then expanded to grasp the green case G inwardly. Thereafter, the piston rod 116 of the cylinder 115 of the second transporting mechanism 102 is retracted to expand the grasping segments 112 and the green case G is delivered from the second transporting mechanism 102 to the second forming drum 62. The second transporting mechanism 102 is then returned to its initial position.

In this manner, the green case G is transferred from the first forming drum 19 to the second forming drum 62. The carriage 74, the grasping unit 94 and the second transporting mechanism 102 are moved in the horizontal planes, so rails are not needed which would make the apparatus bulky as a whole. Therefore, the entire apparatus is small-sized and inexpensive and does not interfere with other equipment, for example, beams for cranes.

Moreover, according to the invention there are successively provided the first and second transporting mechanisms 67 and 102 on the transfer passage of the green case G from the first forming drum 19 to the second forming drum 62 to divide the transfer passage into two parts. Therefore, the transfer cycle times of the first and second transporting mechanisms 67 and 102 can be shortened in comparison with the case that all the cycle times are carried out only by one transporting mechanism.

As a result, the transfer time is made near to or less than the forming cycle times of the first and second forming drums 19 and 62 so that all the cycle time is shortened to improve the operation efficiency. Moreover, if a green case G is temporarily stored at the turning grasping mechanism 121 arranged between the first and second forming drums 19 and 62, any difference in phase between the forming timing of the first and second forming drums 19 and 62 can be taken up by the temporary storing of the green case G.

If the band forming drum is arranged immediately before the second forming drum, the distance between the first and second forming drums becomes long to elongate the cycle time for transferring the green case. However, according to this embodiment the second forming drum 62 is arranged immediately before the band forming drum 55 so that the distance between the first and second forming drums 19 and 62 becomes short so as to shorten the cycle time for transferring to improve the operation efficiency.

On the other hand, the belt and treads previously supplied from the servicer 56 have been successively attached to the band forming drum 55 to form the belt-tread band D. After the third transfer means 146 has been moved rearwardly to be fitted on the band forming drum 55, the band D is delivered from the drum 55 to the third transfer means 146. Thereafter, the third transfer means 146 moves forwardly until it is fitted on the second forming drum 62 so that the band D is transferred to the position radially outward of the green case G on the second forming drum 62.

Thereafter, the second forming drum 62 is expanded to deform the green case G into a toroidal shape, while the band D is attached onto the outer surface of the green case G to form a green tire. The second forming drum 62 is then contracted and the third transfer means 146 is returned to its initial position. Thereafter, the green tire is removed from the second forming drum 62 to a next process by means of a loader (not shown).

The successive steps for manufacturing only one tire have been explained in the above description. In fact, in the embodiment the various steps for tire constituting members are carried out simultaneously in parallel such as forming the carcass band K at the carcass band forming drum 5, forming the green case G at the first forming drum 19, transferring the green case G by the first transporting mechanism 67, turning and temporarily holding the green case G by means of the support holder, transferring the green case G by means of the second transporting mechanism 102, forming the band D at the band forming drum 55 and forming the green tire at the second forming drum 62. As a result, green tires are produced with high efficiency.

In the above embodiment, moreover, the correction arms 158 are rocked to expand the axial end of the carcass band K from its inside to the outside. Other techniques may be used for correcting the axial end of the carcass band K. For example, permanent magnets, electromagnets or vacuum cups having variable attractive forces may be mounted on the pusher segments so that steel cords in the carcass band K or carcass band itself are outwardly attracted to the attracting means, thereby expanding the axial end of the carcass band K.

In the above embodiment, the transfer of a carcass band K has been explained. The invention may be applicable to any tire constituting members other than the carcass band, so long as they are soft cylindrical members. Moreover, the turning grasping mechanism 121 may be turned in a vertical plane although it is turned in the horizontal plane.

As can be seen from the above description, according to the invention the fitting operation of the tire constituting member onto a post-process drum can be easily effected to improve the operation efficiency.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire-building system comprising; a transfer apparatus for tire constituting members which are transferred from a pre-process drum to a post-process drum, said transfer apparatus having a movable frame movable between the pre-process drum and the post-process drum, a holder mounted on the movable frame to outwardly surround and grasp the tire constituting member, and a correction mechanism mounted on the holder on a near side to the post-process drum to expand an axial end of the tire constituting member on a near side to the post-process drum for correcting the tire constituting member into a substantially cylindrical shape, said correction mechanism comprising correction arms and means carrying said correction arms for translatory movement in an axial direction of said post-process drum, and means for moving said correction arms in a radial direction with respect to said post-process drum, said correction arms movable in an axial direction of the post-process drum to a position around said post-process drum without interference between correction arms of said correction mechanism and said post-process drum.

2. A system as set forth in claim 1, wherein said movable frame comprises a movable trolley movable between the pre-process drum and the post-process drum, annular members slidably movable on the movable trolley toward and away from each other, and cam rings one rotatably supported by each of the annular members and carrying pusher segments which are radially moved in synchronism with each other by movement of the cam rings driven by the annular members.

3. A system as set forth in claim 2, wherein said holder comprises said pusher segments and attracting means attached to radially inner ends of the pusher segments.

4. A system as set forth in claim 1, wherein said means carrying said correction arms comprises brackets, mounting beams fixed to the brackets, respectively, movable blocks guided by said brackets, respectively, driving means for driving the movable blocks guided by said brackets, said means for moving said correction arms radially comprising rocking members connected to the movable blocks and having cam followers, said correction arms fixed to the rocking members, respectively, and forming as a whole a cylindrical body, and cam plates so arranged that the cam followers and hence the correction arms are rockably moved in a radial direction of said post-process drum when the cam followers move on the cam plates, thereby correcting a tapered end of a cylindrical tire constituting member into a cylindrical shape during transfer of said cylindrical tire constituting member from said pre-process drum to said post process drum.

5. A tire building system comprising; a transfer apparatus for tire constituting members which are transferred from a pre-process drum to a post-process drum, said transfer apparatus including a movable frame movable between the pre-process drum and the post-process drum, a holder mounted on the movable frame to be able to outwardly surround and grasp the tire constituting member, and a correction mechanism mounted on the holder on a near side to the post-process drum to expand an axial end of the tire constituting member on a near side to the post-process drum for correcting the tire constituting member into a substantially cylindrical shape, said correction mechanism comprising brackets, mounting beams fixed to the brackets, respectively, movable blocks guided by the mounting brackets, respectively, driving means for driving the movable blocks guided by the mounting brackets, rocking members connected to the movable blocks and having cam followers, correction arms fixed to the rocking members, respectively, and forming as a whole a cylindrical body, springs connected between the rocking member and said movable blocks respectively, and a cam plates arranged so that the cam followers and hence the correction arms are rockably moved in a radial direction of said post-process drum when the cam followers move on the cam plates, thereby correcting a tapered end of a cylindrical tire constituting member into a cylindrical shape during transfer of said cylindrical tire constituting member from said pre-process drum to said post-process drum.

* * * * *